Oct. 16, 1934.  E. S. COOK  1,976,876
FLUID PRESSURE BRAKE
Filed June 24, 1933
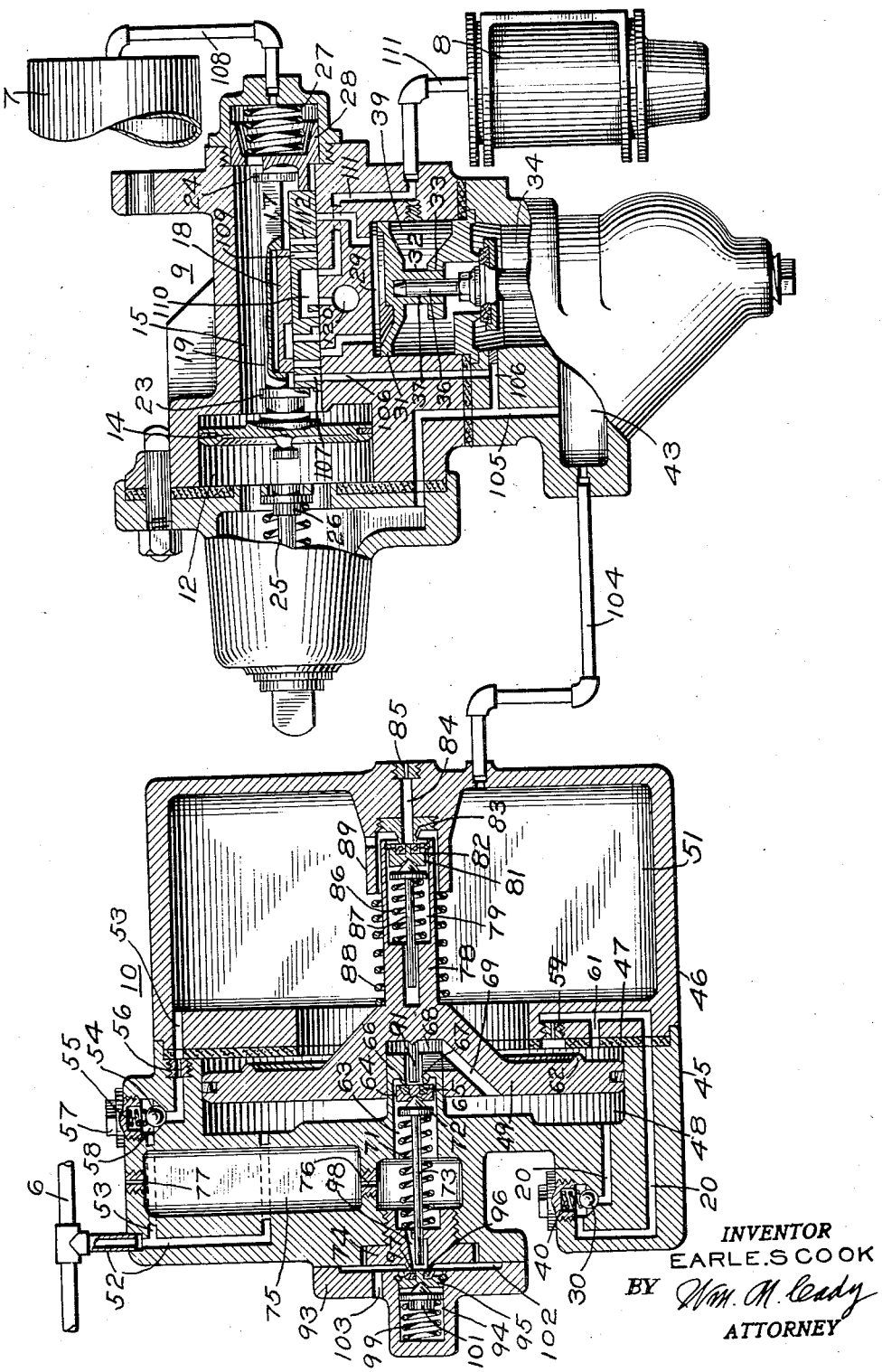
INVENTOR
EARLE. S COOK
BY Wm. M. Cady
ATTORNEY Patented Oct. 16, 1934

1,976,876

UNITED STATES PATENT OFFICE 1,976,876

FLUID PRESSURE BRAKE

Earle S. Cook, Wilkinsburg, Pa., assignor to The Westinghouse Air Brake Company, Wilmerding, Pa., a corporation of Pennsylvania Application June 24, 1933, Serial No. 677,437

5 Claims. (Cl. 303—83)

This invention relates to fluid pressure brakes and particularly to apparatus for controlling the operation of the triple valve devices or other brake controlling valve devices for facilitating the application and release of the brakes on a train of cars.

It is well known, that the brake controlling valve devices, commonly known as triple valve devices, employed for controlling the application and release of the brakes on a train of cars, require a definite reduction in brake pipe pressure to overcome the friction of the main valves in order to effect movement of the triple valve pistons to positions for effecting service or emergency applications of the brakes, and that the rate of brake pipe pressure reduction for effecting a service application of the brakes, is limited to a predetermined rate commonly known as a service rate, in order to obtain movement of the triple valve pistons to service position and so that said pistons will not move to emergency position when a service application of the brakes is desired. Reduction of brake pipe pressure at a rate faster than service rate or at an emergency rate, causes movement of the triple valve pistons and the slide valves to emergency position, wherein an emergency application of the brakes is effected.

The triple valve device commonly known as the K-triple valve device, requires from two to two and one-half pounds brake pipe pressure reduction below that in the auxiliary reservoir (which has been charged to brake pipe pressure) in order to overcome inertia and frictional resistance and to effect movement of the triple valve piston to service position, and a greater reduction in brake pipe pressure to overcome the opposing resistance of a stop spring to effect movement of the piston to emergency position, and it has been found that appreciable time is required to cause said pressure reduction on the rear cars of the train, even though the triple valve device is equipped with the commonly employed quick service and quick action valve devices for locally and progressively venting fluid from the brake pipe when the triple valve is moved to service or emergency position.

Consequently, in making a service application of the brakes on the long train, there is an undesirable lapse of time between the application of the brakes on the cars at the head end of the train and the application of the brakes on the cars at the rear end of the train.

This is also true and is particularly undesirable in making an emergency application of the brakes, for in such case, the slack of the train may run in with undue harshness, due to the sudden retardation of the cars at the head end of the train as a result of the hard application of the brakes on the front cars of the train before the brakes on the rear cars are applied.

It is an object of this invention to provide an accelerator valve device on each car for use in conjunction with a standard K-triple valve device, or any triple or brake controlling valve device not provided with quick service or emergency quick action means and which is more sensitive to fluid pressure variations than the K-triple valve device and which operates upon a relatively slight reduction in brake pipe pressure to effect a local reduction in brake pipe pressure for propagating, through the medium of similar sensitive accelerator valve devices on the cars of the train, serial local brake pipe pressure reductions on successive cars throughout the length of the train, and to thereby accelerate the rate at which the brakes are successively applied on the cars of the train from front to rear.

Another object of the invention is to provide an accelerator valve device having the above noted characteristics, wherein the travel of the fluid pressure sensitive piston for operating the valve for effecting local brake pipe pressure reduction is relatively short so that dampening action, due to piston displacement, is minimized and does not appreciably interfere with quick service and quick action pressure reduction wave transmission.

A further object of the invention is to provide accelerator valve devices for use in conjunction with a standard triple valve device, wherein means are provided for permitting the fluid pressure acting on opposite faces of the triple valve pistons to substantially equalize in the event of an overcharged brake pipe, and thereby prevent an undesired application of the brakes when the brake pipe pressure falls to the lower pressure maintained by the feed valve, not shown, and when the brake valve, not shown, is moved from charging or release position to running position, and insuring a more consistent response of the triple valve devices to effect an application of the brakes upon a reduction in brake pipe pressure closely following a release operation of the brakes.

A further object of the invention is to provide an accelerator valve device having the above noted characteristics, whereby release of the brakes is accelerated from the front to the rear of the train and with more uniform release action.

A further object of the invention is to provide an accelerator valve device for the purposes defined, which may be associated with a standard K-triple valve device without necessitating material structural alterations, and which is relatively simple and of inexpensive and rugged construction.

A further object of the invention is to provide an accelerator valve device having the above noted characteristics and which operates on principles somewhat similar to those employed in the fluid pressure brake equipment disclosed in the copending application of the applicant and Ellery R. Fitch, Serial No. 677,436, filed concurrently herewith and assigned to the assignee of this application, and wherein modified means are provided for controlling the quick service piston and the pressure of the fluid within the quick service chamber.

These and other objects that will be made apparent throughout the further description of the invention are attained by means of the accelerator valve device hereinafter described and illustrated in the accompanying drawing, wherein:

The figure is a sectional view, partially in elevation, of the improved accelerator valve device connected to fluid pressure brake equipment including the triple valve device and showing the parts in release position.

Referring to the drawing, the equipment includes a brake pipe 6, an auxiliary reservoir 7, a brake cylinder 8, a triple valve device 9 and an accelerator valve device 10, all of which equipment is carried on each car of a train of cars.

The triple valve device 9 may comprise a casing having a piston chamber 12 containing a piston 14, and having a valve chamber 15 connected to the auxiliary reservoir 7 and containing a main slide valve 17 and an auxiliary or graduating slide valve 18, mounted on and having a movement relative to the main slide valve, said valves being operated by said piston through a piston stem 19. The main slide valve 17 is disposed between a stop shoulder 23 on the stem 19 and a stop flange or shoulder 24 on the end of the stem, and the shoulders 23 and 24 are so spaced that the stem may be moved within certain limits of movement without effecting movement of the main slide valve 17. The graduating valve 18 is so connected to the stem 19 that it moves with the stem and may lap and uncover ports in the main slide valve, as will hereinafter appear.

A stop spring 25, which yieldingly engages a stop member 26, serves to yieldingly arrest the piston 14 in lap position, wherein the piston just engages the stop member 26 and is adapted to be compressed and permit movement of the piston 14 to service application position or to its extreme left or emergency application position upon reduction of the fluid pressure within the chamber 12 at an emergency rate. A stop spring 27 acting on a stop member 28 serves to yieldingly arrest the piston 14 in normal or full release position (shown in the figure) when the piston is moved to the right from an application position.

The triple valve device shown, being of the well known K type, is provided with means for effecting quick service action and emergency quick action, but when the improved accelerator valve means for securing quick serial service action and emergency quick action is employed, the passages through which quick service and emergency quick action are effected are plugged, so that these features of the K-triple valve device are rendered inoperative.

The accelerator valve device 10 may comprise casing sections 45 and 46 that are secured together by means of bolts, not shown, and with a sealing gasket 47 therebetween. A piston chamber 48 is disposed within the casing 45 and contains an accelerator piston 49 having at one side an accelerator chamber 51 formed in the casing 46.

The piston chamber 48 is connected to the brake pipe 6 by means of passage and pipe 52, the passage being relatively short and having a flow capacity equal to that of the brake pipe. The accelerator chamber 51 is connected to the brake pipe 6 through a passage 53 containing a choke plug having a restricted passage 56 and containing a ball check valve 54 that is loaded by means of a spring 55. The spring 55 which presses the ball check valve 54 into engagement with its seat, is retained by means of a threaded nut 57, which closes the ball check valve chamber 58. In order to vary the spring pressure applied to the ball, a spring having a different tension value may be substituted.

Communication from the piston chamber 48 to the accelerator chamber 51 is established through a passage 20 containing a ball check valve 30 and passages 59 and 61 in the casing 46, the latter being disposed exteriorly of an annular seat rib 62 on the piston 49, which is adapted to make sealing engagement with the sealing gasket 47 under certain charging conditions. The ball check valve 30 is normally yieldingly retained in seated position by a loading spring 40.

The casing 45 contains a quick service valve chamber 63 containing a quick service valve 64 having a sealing seat 65 adapted to engage an annular seat rib 66 and normally close a passage 67, which leads to a chamber 68 in the piston 49, which chamber communicates with the piston chamber 48 through a passage 69. The quick service valve 64 is normally held seated by a spring 71 in the chamber 63 which is disposed between a collar 72 on an operating stem 73 and a threaded nut 74. The stem 73 pivotally engages the valve 64 and permits relative angular movement of the valve with respect to the stem, in order that the valve may be properly seated.

The casing 45 is also provided with a volume reservoir or bulb 75, which is connected to the quick service valve chamber 63 through a restricted or choke passage 76 and which communicates with the atmosphere through a choke passage 77.

The accelerator piston 49 is provided with a tail piece or stem 78 having a bore 79 therein, containing a check valve 81 having a sealing seat 82 adapted to engage an annular seat rib 83 and close an atmospheric passage 84 having a restricted passage 85. The check valve construction is similar to the quick service valve construction and the valve is normally yieldingly held in closed position by means of a spring 86, which presses against an operating stem 87 that is pivotally connected to the valve, as indicated in the figure.

Movement of the accelerator piston 49 toward the right into sealing engagement with the gasket 47, is opposed by a spring 88 surrounding the stem 78 and disposed between the accelerator piston 49 and an extension 89 of the casing 46. A stem 91 on the piston 49 is adapted to engage the valve 64 and cause it to open when the accelerator piston is moved toward the left. When the pressures on opposite faces of the accelerator piston 49 are balanced, the springs 71 and 88 serve to center the piston 49 in the release position shown in the figure. With the accelerator piston 49 in release position, the sealing seat rib 62 on the piston is out of engagement with the gasket 47.

A casing section 93 mounted on the casing section 45, contains a valve chamber 94 containing a quick action valve 95 having a sealing seat 96 adapted to engage an annular seat rib 97 and close a passage 98 leading from the quick service valve chamber 63, the valve being held upon its seat by a spring 99 that is disposed between the casing wall 93 and a centering stem 101 which pivotally engages the valve 95. A chamber 102 is disposed between the casing section 93 and the casing section 45 which is open to the atmosphere through an atmospheric passage 103.

The accelerator chamber 51 is connected to the triple valve piston chamber 12 by a pipe 104, dirt collector chamber 43, and passage 105.

In operation, when initially charging, the brake valve device, not shown, is placed in release position, in which fluid under pressure is supplied from the main reservoir to the brake pipe in the usual well known manner, and after a certain interval the brake valve device is moved to running position, in which the pressure of the fluid supplied to the brake pipe is governed by the feed valve device, not shown.

Assuming that the parts of the accelerator valve device are in lap or release position, as shown in the drawing, to which position they are moved when the pressure on opposite faces of the accelerator piston are balanced, fluid under pressure flows from the brake pipe to the accelerator chamber 51 through pipe and passage 52, piston chamber 48 and the passages 59 and 61 in the casing 46. With the triple valve parts in the normal release position, as shown in the drawing, wherein the brake cylinder 8 is open to the atmosphere by way of pipe and passage 111, cavity 110 in the main slide valve 17, and atmospheric passage 120, fluid under pressure flows from the accelerator chamber 51 to the triple valve piston chamber 12 through pipe 104, dirt collector chamber 43, and passage 105.

With the main slide valve 17 of the triple valve device in normal release position, fluid under pressure flows from the accelerator chamber 51 to the auxiliary reservoir 7 through pipe 104, dirt collector chamber 43, passages 105 and 106, port 107 in the main slide valve 17, valve chamber 15 and pipe 108.

It is well known that when the brake pipe is charged from the main reservoir at the head end of the train, the brake pipe pressure is higher at the head end of the train than it is at the rear end of the train, and that there is a tendency to overcharge the auxiliary reservoirs at the head end of the train before the auxiliary reservoirs at the rear end of the train are fully charged, and that where no means is provided to prevent rapid charge of the auxiliary reservoirs at the head end of the train, the length of time required to supply sufficient fluid under pressure to the auxiliary reservoirs, and to cause release of the brakes on the rear cars of the train is increased.

To overcome this difficulty, provision is made for supplying fluid from the brake pipe to the triple valve piston chambers and auxiliary reservoirs on the cars at the head end of the train for effecting release of the brakes and charging of the reservoirs, at a slower rate than the rate at which fluid is supplied to the triple valve piston chambers and the auxiliary reservoirs on the cars at the rear end of the train. When the brake valve device, not shown, is moved to release position, fluid under pressure is supplied from the main reservoir to the brake pipe at a fast rate, in the usual manner. When fluid under pressure is thus supplied to the piston chambers 48 on the cars at the head end of the train at a faster rate than fluid can flow through the passage 20 past the check valve 30 and through ports 59 and 61 to the accelerator chamber 51, the pressure of fluid in said piston chamber builds up faster than the pressure builds up in the accelerator chamber 51, and when sufficient pressure differential has built up to overcome the tension of the spring 88, the accelerator piston 49 is moved to the right into sealing position wherein the sealing rib 62 engages the gasket 47 and closes communication from the brake pipe to the accelerator chamber 51 through port 62. With the piston 49 in sealing position, fluid under pressure can no longer flow from the piston chamber 48 to the accelerator chamber 51 through the passage 61, and thereafter the accelerator chamber 51 is charged at a slower rate through the restricted port 59, thereby limiting the rate of flow of fluid from the brake pipe to the accelerator chambers on cars at the head end of the train. On cars at the rear end of the train, the brake pipe pressure is lower than on cars at the head end of the train and consequently insufficient pressure differential is built up on opposite sides of the piston 49 to overcome the tension of the spring 88. The pistons 49 on the cars at the rear end of the train therefore remain in normal position, shown in the figure, and consequently fluid under pressure may flow to the accelerator chambers 51 on the rear cars of the train, through the passages 59 and 61. In this manner the auxiliary reservoirs at the head end of the train are supplied with fluid at a slower rate than would ordinarily be the case, thus conserving the fluid under pressure supplied to the brake pipe for delivery to the triple valve devices and auxiliary reservoirs on the cars at the rear end of the train, and effecting more uniform release of the brakes in a shorter time and more uniform charging of the auxiliary reservoirs.

It will be understood that fluid under pressure supplied to the accelerator chambers 51 on the cars at the head end of the train, from the brake pipe 6 through the port 59 in the casing 46, flows through the pipe 104, dirt cleaner chamber 43 and passage 105 to the triple valve piston chamber 12 at a rate sufficient to cause sufficient pressure differential on opposite sides of the triple valve pistons 14 to move them to normal release position shown in the figure.

When the equipment is thus charged and the brakes are released, a reduction in brake pipe pressure will effect an application of the brakes in a manner to be hereinafter described.

Assuming the brake equipment to be in fully charged condition and the parts of the equipment to be in the release position shown in the figure, in order to effect a service application of the brakes, the brake valve device, not shown, is moved to application position, where it is held until the desired reduction in brake pipe pressure at a service rate has been effected. The reduction in brake pipe pressure at the head end of the train immediately effects reduction of the pressure of the fluid in the piston chamber 48 of the accelerator valve devices on the cars at the head end of the train. Reduction of fluid pressure in the chamber 48 causes the higher pressure in chamber 51, acting on the right face of the piston 49, to move it to the left. The present device is so constructed that the piston will move as soon as there is built up a differential pressure of a quarter of a pound in the chamber 51. As the piston 49 thus moves, the stem 91 unseats the valve 64 against the opposing pressure of the spring 71. When the valve 64 is thus unseated, fluid is vented from the piston chamber 48 to the quick service bulb 75 through port 69 in the piston 49 past the open valve 64, chamber 63 and restricted passage 76, the flow area of said restricted passage being such as to permit a rapid venting of fluid under pressure from the accelerator chamber 51 into the quick service bulb 75. Since the brake pipe is in communication with piston chamber 48 through the pipe and passage 52, the venting of piston chamber 48 causes a local venting of fluid from the brake pipe and this venting is effected serially on the cars of the train from front to rear.

Movement of the quick service piston 49 to the left, unseats the valve 81 and permits fluid under pressure to flow from the accelerator chamber to the atmosphere through passage 84 and restricted passage 85. Fluid under pressure flowing to atmosphere through the restricted passage 85, causes reduction of the pressure in the accelerator chamber at a service rate and a corresponding reduction in the pressure in the triple valve piston chamber 12, which constitutes a part of the accelerator chamber volume.

When the brake pipe pressure in the triple valve piston chamber 12 is reduced by the aforementioned local venting of accelerator chamber pressure sufficiently below the auxiliary reservoir pressure in the valve chamber 15, that the differential created on the piston 14 is great enough to overcome the resistance offered by the piston and main slide valve 17 in addition to the resistance of the graduating spring 25, the piston will move toward the left to full service position, carrying the slide valve 17 with it to service application position. With the triple valve piston 14 and main slide valve 17 in service application position, fluid under pressure flows from the auxiliary reservoir 7 to the brake cylinder 8 through pipe 108, valve chamber 15, service port 109 in the main slide valve 17, and passage and pipe 111. A service application of the brakes is, therefore, effected.

As the main slide valve 17 moves from release position toward service application position, communication from the accelerator chamber 51 to the triple valve chamber 15 through pipe 104 and passage 106 is cut off.

The initial reduction in fluid pressure in the piston chamber 48 caused by opening of the valve 64 and the establishing of communication between the piston chamber 48 and the bulb 75 in the manner described, causes, as previously described, a local reduction in brake pipe pressure at the head cars of the train, which is transmitted to the quick service equipment on the succeeding cars, thereby serially propagating local quick service action throughout the train for rapidly effecting serial service application of the brakes on the cars throughout the length of the train.

At the conclusion of the brake pipe pressure reduction for effecting a service application of the brakes, the fluid pressures within the piston chamber 48 and the chamber 51 acting on opposite faces of the accelerator piston 49 equalize through ports 59 and 61 in the casing 46, thereby permitting the spring 71 acting on the valve 64 to move the valve 64 to lap or closed position and also to move the accelerator piston 49 to the normal release position shown in the figure.

When the desired reduction in brake pipe pressure has been effected and the brake valve device, not shown, is turned to lap position in the usual manner, the triple valve device operates to supply fluid from the auxiliary reservoir to the brake cylinder until the pressure in the auxiliary reservoir has been reduced to a degree slightly less than the reduced brake pipe pressure, at which time the triple valve piston 14 is moved by the spring 25 so as to shift the graduating valve 18 to lap position.

With the main and graduating slide valves in lap position the service port 109 is lapped by the graduating valve and passage 111 is lapped by the main slide valve and communication from the auxiliary reservoir to the brake cylinder is therefore closed so that no further fluid is supplied to the brake cylinder and fluid under pressure is retained therein in the well known manner.

With the accelerator piston 49 in the normal position shown in the figure, the valve 64 is closed and the fluid under pressure within the quick service bulb 75 flows to atmosphere at a rate as permitted by the restricted passage 77 so that the pressure in the quick service bulb 75 is reduced to provide for further reduction in brake pipe pressure when the accelerator piston opens the communication from the brake pipe to the bulb past the valve 64.

Should it be desired to increase the force with which the brakes are applied, a further reduction in brake pipe pressure is effected by moving the brake valve device, not shown, to service application position. In this event the operation of the accelerator piston and the triple valve piston as above described is repeated and may be repeated as desired. The flow capacity of the restricted port 77 may be such that the quick service bulb will not be completely vented between successive operations of the piston 49. In this event the succeeding local reductions in brake pipe pressure will be less in degree than the local reduction, it being desirable to provide a slightly heavier initial reduction in order to compensate for the displacement of the brake cylinder piston.

In the copending application of Ellery R. Fitch and the applicant, Serial No. 563,278, assigned to the assignee of this application, a brake apparatus is disclosed for securing what is termed a "rippler quick service", in which the cars of the train are equipped with a quick service vent valve device which responds quickly to a light reduction in brake pipe pressure and the locomotive with means for effecting light successive reductions in brake pipe pressure, so long as the brake valve device is held in service application position. If the present construction is to be employed in connection with such apparatus, then the volume of the quick service bulb should be made small.

To effect release of the brakes, the brake valve device, not shown, is moved to release position wherein fluid is supplied from the main reservoir to the brake pipe, thereby so increasing the brake pipe pressure that the quick service pistons on the cars at the head end of the train, where the brake pipe pressure is high, are moved to sealing position in the manner previously described. When the pressure in the accelerator chamber 51 and the triple valve piston chamber 12 builds up and exceeds the auxiliary reservoir pressure in the valve chamber 15, the triple valve pistons 14 are moved to release position shown in the figure.

In order to effect an emergency application of the brakes, the brake valve device, not shown, is moved to emergency position, wherein the brake pipe pressure is reduced at an emergency rate. Upon a reduction of brake pipe pressure at an emergency rate, the pressure of the fluid within the piston chamber 48 is reduced at an emergency rate, and the differential pressure thus created in chamber 51 is so high as to cause piston 49 to move toward the left with sufficient force to overcome the tension of the spring 71 of the quick service valve and to force the stem 73 thereof into engagement with the emergency vent valve 95 and force it open against the action of the spring 99. With the emergency valve 95 open, fluid under pressure flows from the piston chamber 48 to the atmosphere through port 69 in the piston 49, chamber 68, passage 67, past the open quick service valve 64, chamber 63, port 98, past the open emergency vent valve 95, chamber 102 and atmospheric passage 103. The sudden reduction in fluid pressure in the chamber 48, caused by the opening of the emergency valve 95, effects a relatively great local reduction in fluid pressure in the brake pipe. The movement of the piston 49 to the left also causes unseating of the valve 81. With the valve 81 unseated, fluid under pressure flows from the accelerator chamber 51 to the atmosphere through the restricted passage 85.

The local reduction in brake pipe pressure at an emergency rate also causes the higher accelerator chamber pressure acting on the ball check valve 54 to move it to open position against the action of the spring 55 and permit fluid to flow from the accelerator chamber 51 to the brake pipe through the passage 53 and restricted passage 56.

The combined flow of fluid through passages 56 and 85, causes reduction of fluid pressure in the quick service chamber 51 and the piston chamber 12 at an emergency rate. The higher auxiliary reservoir pressure acting on the right face of the piston 14, causes movement thereof to emergency position, wherein the emergency port 112 in the main slide valve 17 registers with the passage and pipe 111. With the triple valve piston 14 in emergency position, fluid under pressure flows from the auxiliary reservoir 7 to the brake cylinder 8 through pipe 108, valve chamber 15, emergency port 112 in the main slide valve 17 and passage and pipe 111, thereby effecting an emergency application of the brake.

The local reductions of brake pipe pressure at an emergency rate at the head cars of the train, effected by the discharge of fluid under pressure from the piston chambers 48 to the bulbs 75 and to the atmosphere in the manner above described, propagate throughout the length of the train, serial local reductions in brake pipe pressure at an emergency rate for effecting successive operations of the quick service pistons. After an emergency application of the brakes, the brakes may be released and the system recharged in the manner above described.

It is apparent from the foregoing, that the improved control equipment for brake controlling valve devices effects a more rapid serial application of the brakes throughout the length of the train than can ordinarily be obtained by use of the K-triple valve devices, and that the brakes may be released and the brake system recharged with greater facility and more uniformly than has heretofore been possible with devices of the K-triple valve type.

While but one embodiment of the invention is herein disclosed, it is obvious that additions, omissions and other changes may be made in the construction without departing from the spirit of the invention.

Having now described my invention, what I claim as new and desire to secure by Letters Patent, is:

1. In a fluid pressure brake, the combination with a brake pipe, a chamber, and a fluid pressure actuated brake controlling valve device operated by a reduction in pressure in said chamber for effecting an application of the brakes, of an accelerator valve device comprising a quick service valve for controlling a communication through which fluid is vented from the brake pipe at a service rate, a quick action valve for controlling a communication through which fluid under pressure is vented from the brake pipe at an emergency rate, a vent valve for controlling a communication through which fluid is vented from the chamber, and a fluid pressure actuated valve means for controlling a communication through which fluid is vented from the chamber and operated by a reduction in brake pipe pressure at an emergency rate to open its respective communication, and means operated by a reduction in brake pipe pressure to open said valves.

2. In a fluid pressure brake, the combination with a brake pipe, a chamber, and a fluid pressure actuated brake controlling valve device operated by a reduction in pressure in said chamber for effecting an application of the brakes, of an accelerator valve device comprising a quick service valve for controlling a communication through which fluid is vented from the brake pipe at a service rate, a quick action valve for controlling a communication through which fluid under pressure is vented from the brake pipe at an emergency rate, a vent valve for controlling a communication through which fluid is vented from the chamber, and a fluid pressure actuated valve means for controlling a communication through which fluid is vented from the chamber and operated by a reduction in brake pipe pressure at an emergency rate to open its respective communication, and means operated by a reduction in brake pipe pressure to concurrently open said quick service and vent valves and to subsequently open said quick action valves.

3. In a fluid pressure brake, the combination with a brake pipe, a chamber and a fluid pressure actuated brake controlling valve device operated by a reduction in pressure in said chamber for effecting an application of the brakes, of a movable abutment subject on one side to brake pipe pressure and on the other side to pressure in said chamber and movable in response to reductions in brake pipe pressure, a quick service valve means actuated by said abutment for effecting the venting of fluid under pressure from the brake pipe at a predetermined rate when said abutment is operated in response to a reduction in brake pipe pressure at a service rate, a vent valve means actuated by the abutment for effecting the local venting of fluid from the brake pipe at a rate faster than said predetermined rate when the said abutment is operated in response to a reduction in brake pipe pressure at an emergency rate, the said chamber being so connected with the brake pipe that said chamber is subject to said local reductions in brake pipe pressure for effecting reductions in chamber pressure at rates corresponding to the rates of local brake pipe pressure reduction, and a vent valve means actuated by the abutment for effecting venting of fluid from said chamber to the atmosphere when the abutment is operated in response to a reduction in brake pipe pressure.

4. In a fluid pressure brake, the combination with a brake pipe, a chamber communicating with said brake pipe through a restricted passage and a fluid pressure actuated brake controlling valve device operated by a reduction in pressure in said chamber for effecting an application of the brakes, of an accelerator valve device comprising a movable abutment subject on one side to brake pipe pressure and on the other side to chamber pressure, a quick service valve means for controlling a communication through which fluid is locally vented from the brake pipe at a predetermined rate, a quick action valve means for controlling a communication through which fluid is locally vented from said brake pipe at a faster rate than said predetermined rate, a vent valve for controlling a communication through which fluid is vented from said chamber, the said abutment being operated by a reduction in brake pipe pressure at a service rate to open said quick service valve means and said vent valve for effecting local venting of fluid from said brake pipe and venting of fluid from said chamber, and said abutment being operated by a reduction in brake pipe pressure at an emergency rate to open said quick action valve for effecting local reduction of brake pipe pressure at a faster rate than said predetermined rate for increasing the flow of fluid from said chamber through said passage at a faster rate so as to effect reduction in pressure in said chamber at emergency rate.

5. In a fluid pressure brake, the combination with a brake pipe, a chamber communicating with said brake pipe through a restricted passage, a fluid pressure actuated valve for controlling said passage adapted to operate and open said passage when the brake pipe pressure is reduced a predetermined degree below the pressure of the fluid in said chamber, and a fluid pressure actuated brake controlling valve device operated by a reduction in pressure in said chamber for effecting an application of the brakes, of an accelerator valve device comprising a quick service valve means for controlling a communication through which fluid is locally vented from the brake pipe at a certain rate, a quick action valve means for controlling a communication through which fluid is locally vented from the brake pipe at a faster rate than said certain rate, a vent valve for controlling a communication through which fluid is vented from said chamber, and means operated by a reduction in brake pipe pressure at a service rate to open said quick service valve means and said vent valve for effecting local venting of fluid from said brake pipe and venting of fluid from said chamber, and said means being operated by a reduction in brake pipe pressure at an emergency rate to open said quick action valve for effecting local reduction of brake pipe pressure at a rate sufficient to cause opening movement of said pressure actuated valve for increasing the rate of flow of fluid from said chamber.

EARLE S. COOK.